(12) United States Patent
Vanbesien et al.

(10) Patent No.: US 8,753,441 B2
(45) Date of Patent: *Jun. 17, 2014

(54) BIO-RENEWABLE PHASE CHANGE INKS COMPRISING RECYCLED RESIN MATERIALS

(71) Applicant: Xerox Corporation, Norwalk, CT (US)

(72) Inventors: Daryl W. Vanbesien, Ontario (CA);
Guerino G. Sacripante, Ontario (CA);
Adela Goredema, Ontario (CA);
Naveen Chopra, Mississauga (CA);
Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,206

(22) Filed: Nov. 19, 2012

(65) Prior Publication Data

US 2014/0137768 A1    May 22, 2014

(51) Int. Cl.
*C09D 11/02* (2014.01)

(52) U.S. Cl.
USPC .................................... 106/31.29; 106/31.61

(58) Field of Classification Search
USPC .......................................... 106/31.29, 31.61
See application file for complete search history.

(56) References Cited

U.S. PATENT DOCUMENTS

| | | |
|---|---|---|
| 4,490,731 A | 12/1984 | Vaught |
| 5,195,430 A | 3/1993 | Rise |
| 5,389,958 A | 2/1995 | Bui |
| 5,621,022 A | 4/1997 | Jaeger |
| 5,876,492 A | 3/1999 | Malhotra et al. |
| 6,221,137 B1 | 4/2001 | King |
| 6,221,535 B1 | 4/2001 | King |
| 6,306,203 B1 | 10/2001 | Malhotra et al. |
| 6,334,890 B1 | 1/2002 | Goodbrand et al. |
| 6,472,523 B1 | 10/2002 | Banning |
| 6,476,219 B1 | 11/2002 | Duff |
| 6,576,747 B1 | 6/2003 | Carlini |
| 6,576,748 B1 | 6/2003 | Carlini |
| 6,590,082 B1 | 7/2003 | Banning |
| 6,646,111 B1 | 11/2003 | Carlini |
| 6,663,703 B1 | 12/2003 | Wu |
| 6,673,139 B1 | 1/2004 | Wu |
| 6,696,552 B2 | 2/2004 | Mayo |
| 6,713,614 B2 | 3/2004 | Carlini |
| 6,726,755 B2 | 4/2004 | Titterington |
| 6,755,902 B2 | 6/2004 | Banning |
| 6,821,327 B2 | 11/2004 | Jaeger |
| 6,958,406 B2 | 10/2005 | Banning |
| 7,053,227 B2 | 5/2006 | Jaeger |
| 7,381,831 B1 | 6/2008 | Banning |
| 7,427,323 B1 | 9/2008 | Birau |
| 2002/0124771 A1 | 9/2002 | Hendricks et al. |
| 2008/0302272 A1 | 12/2008 | Allen et al. |
| 2010/0086683 A1* | 4/2010 | Birau et al. .................. 427/256 |
| 2012/0272865 A1 | 11/2012 | Morimitsu et al. |
| 2012/0274699 A1 | 11/2012 | Belelie et al. |

OTHER PUBLICATIONS

U.S. Appl. No. 13/457,157, filed Apr. 26, 2012, Iftime.
U.S. Appl. No. 13/456,847, filed Apr. 26, 2012, Iftime.
U.S. Appl. No. 13/095,784, filed Apr. 27, 2011, Morimitsu.
U.S. Appl. No. 13/095,636, filed Apr. 27, 2011, Belelie.

* cited by examiner

*Primary Examiner* — Veronica F Faison
(74) *Attorney, Agent, or Firm* — Pillsbury Winthrop Shaw Pittman LLP

(57) ABSTRACT

A phase change ink composition suitable for ink jet printing, including printing on coated paper substrates. In embodiments, the phase change ink composition comprises both a crystalline compound and an amorphous compound which are derived from bio-renewable and recycled starting materials. The composition provides for a robust, rapid crystallization ink composition.

20 Claims, No Drawings

BIO-RENEWABLE PHASE CHANGE INKS COMPRISING RECYCLED RESIN MATERIALS

CROSS-REFERENCE TO RELATED APPLICATIONS

Reference is made to commonly owned and co-pending, U.S. patent application Ser. No. 13/681,106 entitled "Bio-renewable Fast Crystallizing Phase Change Inks" to Adela Goredema et al., electronically filed on the same day herewith; U.S. patent application Ser. No. 13/680,818 entitled "Bio-renewable Fast Crystallizing Phase Change Inks" to Adela Goredema et al., electronically filed on the same day herewith; U.S. patent application Ser. No. 13/680,200 entitled "Ester Resin Compositions" to Adela Goredema et al., electronically filed on the same day herewith; U.S. patent application Ser. No. 13/680,322 entitled "Ink Compositions Incorporating Ester Resins" to Adela Goredema et al., electronically filed on the same day herewith; U.S. patent application Ser. No. 13/680,237 entitled "Oligomeric Rosin Esters for Use in Inks," to Rina Carlini et al., electronically filed on the same day herewith; U.S. patent application Ser. No. 13/680,668 entitled "Phase Change Inks Containing Oligomeric Rosin Esters," to Rina Carlini et al., electronically filed on the same day herewith; and U.S. patent application Ser. No. 13/681,206 entitled "Bio-Renewable Phase Change Inks Comprising Recycled Resin Materials," to Daryl W. Vanbesien et al., electronically filed on the same day herewith.

BACKGROUND

The present embodiments relate to phase change ink compositions characterized by being solid at room temperature and molten at an elevated temperature at which the molten ink is applied to a substrate. These phase change ink compositions can be used for ink jet printing. The present embodiments are directed to a novel phase change ink composition comprising an amorphous compound, a crystalline compound, and optionally a colorant, and methods of making the same. The specific formulations described herein are "green" and eco-friendly. More particularly, the present phase change ink compositions comprises a combination of an amorphous compound and crystalline compound which have low compatibility and are derived from bio-renewable materials which provide fast crystallizing ink compositions that form high quality images when printed on coated paper substrates. Furthermore, the crystalline compound can also be derived from a recycled resin. Thus, the crystalline compound used in the present embodiments has up to 100% green content from a combination of bio-renewable and recycled starting materials.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions, preferably those derived from bio-renewable sources, for phase change ink compositions and future printing technologies to provide customers with excellent image quality on all substrates. There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided a phase change ink comprising: an amorphous component; a crystalline component having the following structure:

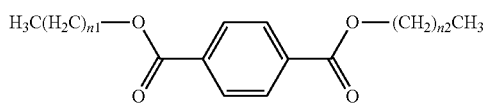

wherein n1 is between 1 and 40, and n2 is between 1 and 40; and an optional colorant, wherein the crystalline compound is derived from bio-renewable and recycled starting materials.

In particular, the present embodiments provide a phase change ink comprising: an amorphous component selected from the group consisting of Abitol E succinic acid, Abitol E tartaric acid, and mixtures thereof; a crystalline component having the following structure:

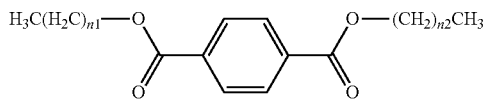

wherein n1 is between 1 and 40, and n2 is between 1 and 40; and a colorant, wherein the crystalline compound is derived from bio-renewable and recycled starting materials.

In yet other embodiments, there is provided a method for making a phase change ink comprising: initiating glycolysis of recycled polyethylene terephthalate plastics to form oligomeric polyethylene terephthalate; reacting the oligomeric polyethylene terephthalate with a bio-renewable alcohol to produce a crystalline component having the following structure:

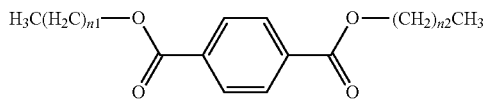

wherein n1 is between 1 and 40, and n2 is between 1 and 40; mixing together an amorphous component, the crystalline component and an optional colorant to form a phase change ink, wherein the crystalline compound is derived from bio-renewable and recycled starting materials.

DETAILED DESCRIPTION

In the following description, it is understood that other embodiments may be utilized and structural and operational changes may be made without departure from the scope of the present embodiments disclosed herein.

Phase change ink technology broadens printing capability and customer base across many markets, and the diversity of printing applications will be facilitated by effective integration of printhead technology, print process and ink materials. The phase change ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

Conventional phase change ink technology has been successful in producing vivid images and providing economy of jet use and substrate latitude on porous papers. However, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components. There is a further need for printing these inks at high speeds as required by digital presses in production environment.

For example, energy and environmental policies, increasing and volatile oil prices, and public/political awareness of the rapid depletion of global fossil reserves have created a need to find sustainable monomers derived from biomaterials. The present embodiments use bio-renewable materials for use in the ink compositions. The term "bio-renewable" is used to mean a material comprised of one or more monomers that are derived from plant material. By using such bio-derived feedstock, which are renewable, manufacturers may reduce their carbon footprint and move to a zero-carbon or even a carbon-neutral footprint. Bio-based materials are also very attractive in terms of specific energy and emission savings. Utilizing bio-renewable feedstock can decrease the amount of waste targeted for landfills, and reduce the economic risks and uncertainty associated with reliance on petroleum imported from unstable regions.

Another manner of providing "green" starting materials is through recycled stock. Plastic recycling, for example, offers a means of almost eliminating the $CO_2$ footprint caused by raw materials used ink manufacturing. Thus, if recycled plastic could be used to make an ink component, the sustainability content of the ink could be increased. Thus, based on the above, the inventors have discovered a way to use a combination of bio-renewable and recycled starting materials for ink components which has significantly increased the sustainability content of the ink and reduced the overall $CO_2$ footprint of such ink.

It was previously discovered that using a mixture of crystalline and amorphous small molecule compounds in phase change ink formulations provides robust inks, and in particular, phase change inks which demonstrate robust images on coated paper, as disclosed in U.S. patent application Ser. No. 13/095,636 to Jennifer L. Belelie et. al. filed Apr. 27, 2011, and hereby incorporated by reference in its entirety. Print samples made with such phase change inks demonstrate better robustness as compared to currently available phase change inks.

The present inventors have also found that fast crystallization of a composition made of a crystalline and an amorphous component is not an inherent property of the composition. The rate of crystallization of the crystalline/amorphous mixture is a function of not only the crystalline and amorphous components independently, but even more importantly, is influenced by the selection of the pair of crystalline and amorphous materials. For example, a given crystalline component may provide a fast crystallizing composition when mixed with one amorphous component but the same crystalline component can result in a slow crystallizing composition when mixed with a different amorphous component. The relationship between the chemical structures of the pair of crystalline and amorphous components controls the rate of crystallization of a given mixture. However, then the selection of the particular pair of crystalline and amorphous components to provide fast crystallizing inks is complicated.

The present embodiments provide a formulation for ink compositions that are based on crystalline and amorphous components which not only provide robust inks, and in particular, phase change inks which demonstrate robust images on coated paper, but further is fast crystallizing and derived from bio-renewable materials.

The present embodiments provide a new type of ink jet phase change ink composition which comprises a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10.

Each compound or component imparts specific properties to the phase change inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

U.S. patent application Ser. No. 13/457,157 to Gabriel Mime et al., electronically filed on Apr. 26, 2012 discloses one method to achieve fast solidifying inks by using a composition wherein the crystalline and amorphous components have limited compatibility, which is hereby incorporated by reference in its entirety. By limited compatibility, it is meant that the two components have a tendency to quickly phase separate when cooled down from a molten state. Limited compatibility is achieved by selecting the crystalline and amorphous components such as to satisfy a set of design rules regarding the relationship between the functional groups present in the chemical structures of a selected pair of a crystalline and amorphous components respectively to provide the ability to rapidly crystallize. Briefly, the design rules are set forth below:

(1) The phase change ink composition comprises an amorphous compound and a crystalline compound;

(2) The amorphous compound comprises an amorphous core moiety having at least one functional group and being attached to at least one amorphous terminal group, wherein the amorphous terminal group comprises an alkyl group, wherein the alkyl is straight, branched or cyclic, saturated or unsaturated, substituted or unsubstituted, having from about 1 to about 40 carbon atoms; a diagram showing the structure of an amorphous compound is shown below:

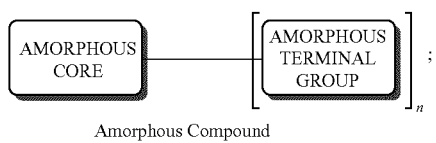

Amorphous Compound n = 1-4

(3) The crystalline compound comprises a crystalline core moiety having at least one functional group and being attached to at least one crystalline terminal group, wherein the crystalline core group comprises an aromatic group; a diagram showing the structure of a crystalline compound is shown below:

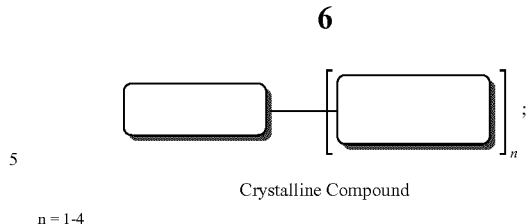

Crystalline Compound n = 1-4 and (4) No one functional group in the amorphous core moiety is the same as any of the functional group of the crystalline core moiety.

The present embodiments use biodegradable, fast crystallizing di-esters with hydrophobic character and amorphous components derived from bio-renewable materials. In embodiments, the present embodiments provide inks that comprise at least 20% bio-renewable content, or from about 20 to about 85% bio-renewable content, or from about 65 to about 83%. This means that at least 20% of the ink components are derived from renewable resources such as plants. In particular, the ink compositions contain inexpensive sharp-melting crystalline materials derived from fatty monoalcohols and a diacid, such as terephthalic acid, which functions as the phase-change component, in addition to other di-esters which function as the amorphous binder resins. The fatty alcohols give the ink some hydrophobic character which helps increase ink spreadability, an improvement from other ink formulations. The crystalline materials are both inexpensive and biodegradable. The phase change inks made from these materials demonstrate excellent robustness compared to commercially available phase change inks on the same substrate.

The present embodiments also provide a further manner in which the "green" content, or content derived from sustainable sources such as bio-renewable or recycled sources, of the crystalline component is increased. For example, in embodiments, the crystalline component is comprised of from about 60 to about 100% bio-renewable content. In embodiments, the crystalline component is comprised of from about 10 to about 40% recycled content.

In embodiments, the crystalline component comprises a terephthalate core and amorphous diester, as described above. In further embodiments, the terephthalate core is made from a recycled resin, which comprises a terephthalate core and aliphatic chain. In particular, the resin is comprised of oligomeric polyethylene terephthalate (PETE) obtained from the glycolysis of recycled polyethylene terephthalate plastics to prepare a recycled crystalline resin for forming the terephthalate core of the crystalline component. In embodiments, the crystalline compound is of the general structure:

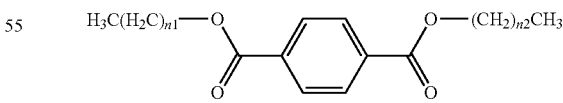

wherein n1 is between 1 and 40, and n2 is between 1 and 40.

The recycled PETE oligomer can be used in combination with an alcohol, such as stearic alcohol or behenyl alcohol to produce the crystalline component for the phase change ink of the present embodiments. The resulting crystalline component is thus a combination of both bio-renewable and recycled material. In such embodiments, the inks made from the crystalline component can comprise at least 70% green content. In further embodiments, the inks comprise 80% to about 100% green content. In yet further embodiments, the inks comprise greater than 95% green content, which is the highest green content ever reported for an inkjet ink.

In order to evaluate the suitability of a test ink for fast printing, a quantitative method for measuring the rates of crystallization of phase change inks containing crystalline components was developed. Time-Resolved Optical Microscopy (TROM) provides comparison between various test samples and, as a result, is a useful tool for monitoring the progress made with respect to the design of fast crystallizing inks. TROM is described in U.S. patent application Ser. No. 13/456,847 to Gabriel Iftime et al., electronically filed on Apr. 26, 2012, which is hereby incorporated by reference in its entirety.

TROM monitors the appearance and the growth of crystals by using Polarized Optical Microscopy (POM). The sample is placed between crossed polarizers of the microscope. Crystalline materials are visible because they are birefringent. Amorphous materials or liquids, such as inks in their molten state, that do not transmit light, appear black under POM. Thus, POM provides an image contrast when viewing crystalline components and allows for pursuing crystallization kinetics of crystalline-amorphous inks when cooled from the molten state to a set-temperature. In order to obtain data that allow comparison between different and various samples, standardized TROM experimental conditions were set, with the goal of including as many parameters relevant to the actual printing process. The ink or ink base is sandwiched between 18 mm circular thin glass slides. The thickness of the ink layer is kept at 20-25 μm (controlled with fiberglass spacers) which is close to actual printed ink layers. For rate of crystallization measurement, the sample is heated to the expected jetting temperature (viscosity of about 10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this disclosure). Crystal formation and growth is recorded with a camera.

It should be understood that the crystallization times obtained with the TROM method for selected inks are not identical to what would be the crystallization times of a droplet of ink in an actual printing device. In an actual printing device such as a printer, the ink solidifies much faster. It is determined that there is a good correlation between the total crystallization time as measured by the TROM method and the solidification time of an ink in a printer. In the standardized conditions described above, it is also determined that inks which solidify within 20 seconds, within 15 seconds, or within 10 seconds (i.e., Total crystallization time <20 s, <15 s or <10 s), as measured by the TROM method, are suitable for fast printing, typically at speeds from 100 feet/minute or higher. Therefore, for the purpose of the present disclosure, a rate of crystallization lower than 15 seconds is considered to be fast crystallizing. However, very high speed printing in the order of 500 feet/minute or higher require inks with a crystallization rate as measured by TROM in the range of less than about 7 seconds in the standardized TROM conditions.

In practice, we have found that inks with $time_{total}$ (Crystalline and Amorphous) lower or equal to 15 seconds in the TROM test are suitable for fast printing at speeds of about 100 feet per minute or higher.

In certain embodiments, the total crystallization time of the phase change ink is no more than 5 times the total crystallization time of the crystalline compound alone. In further embodiments, the total crystallization time of the phase change ink is no more than 4 times the total crystallization time of the crystalline compound alone. In yet further embodiments, the total crystallization time of the phase change ink is no more than 3 times the total crystallization time of the crystalline compound alone.

In embodiments, the phase change inks meet certain specific physical properties. For example, the phase change inks of the present embodiments have a melting point ($T_{melt}$) of from about 65° C. to about 150° C. or from about 70° C. to about 140° C., or from about 80° C. to about 135° C. In other embodiments, the ink has a crystallization temperature ($T_{crys}$) of from about 40° C. to about 140° C. or from about 45° C. to about 130° C., or from about 50° C. to about 120° C., as determined by DSC at a rate of 10° C./min. In other embodiments, the ink of the present embodiments has a viscosity of from about 1 to about 22 cps in a jetting range of from about 100 to about 140° C. In particular, the ink of the present embodiments has a viscosity at 140° C. of <12 cps or from about 12 cps to about 3 cps, or from about 10 cps to about 5 cps. The ink may have a viscosity of greater than about $10^6$ cps at room temperature.

The Amorphous Compound

In embodiments, the amorphous compound functions as the binder agent for the crystalline component and any colorants or other minor additives. In the present embodiments, the amorphous compound is an ester compound having the general formula:

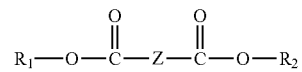

wherein $R_1$ and $R_2$ each, independently of the other, is an alkyl group, an aryl group, an arylalkyl group or a bicyclic system and Z is an alkylene group, an arylene group, an arylalkylene group, or an alkylarylene group. In specific embodiments, the amorphous compound has the structure discussed below.

Some suitable amorphous materials are disclosed in U.S. patent application Ser. No. 13/095,784 to Morimitsu et al., which is hereby incorporated by reference in its entirety. The amorphous materials may comprise an ester of tartaric acid having a formula of

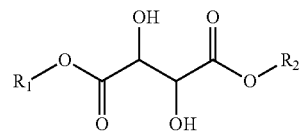

wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<$10^2$ centipoise (cps), or from about 1 to about 100 cps, or from about 5 to about 95 cps) near the jetting temperature (5140° C., or from about 100 to about 140° C., or from about 105 to about 140° C.) but very high viscosity (>$10^5$ cps) at room temperature.

To synthesize the amorphous component, tartaric acid was reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomenthol and any stereoisomers and mixtures thereof. Mixtures of aliphatic alcohols may be used in the esterification. For example, a mixture of two aliphatic alcohols may be used in the esterification. Suitable examples of aliphatic alcohols that can be used in these mixed reactions are cyclohexanol and substituted cyclohexanols (e.g., 2-, 3- or 4-t-butyl cyclohexanol). The molar ratios of the aliphatic alcohols may be from 25:75 to 75:25, from 40:60 to 60:40, or about 50:50.

Some more suitable amorphous materials are disclosed in U.S. patent application Ser. No. 13/680,200 to Goredema et al., which is hereby incorporated by reference in its entirety.

In another embodiment, the amorphous material may comprise a di-ester having the general formula;

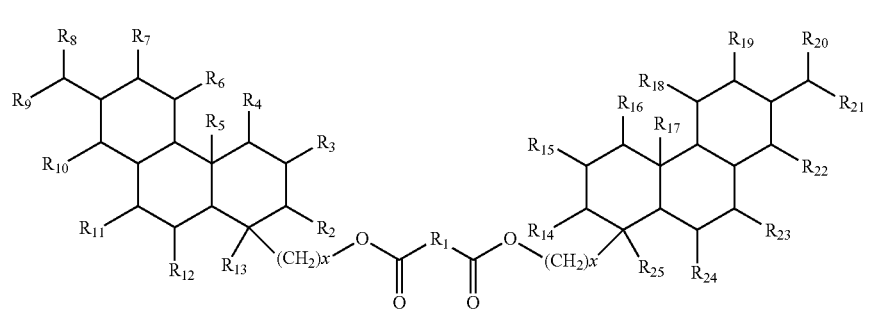

(I)

or

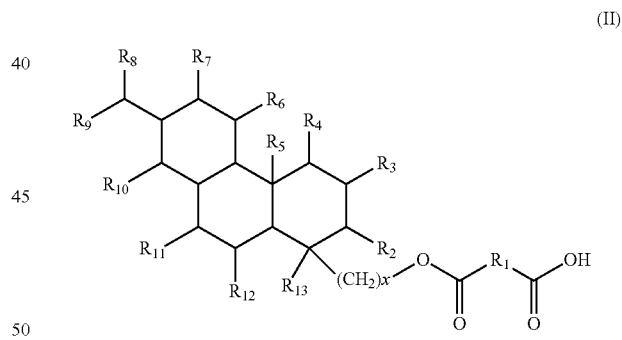

(II)

or a mixture of one or more compounds of General Formulas I and/or 11; wherein $R_1$ is an alkylene group, arylene group, arylalkylene group, alkylarylene group, including substituted and unsubstituted alkylene groups, and wherein hetero-atoms either may or may not be present in the alkylene group such an alkylene group containing from 2 to about 12 carbon atoms, the $R_2$-$R_{25}$ groups are independently selected from the group consisting of hydrogen, alkyl groups, arylalkyl groups, alkylaryl groups, and heterocyclic groups; wherein one or more of $R_2$-$R_{25}$ groups are included by a ring structure; and wherein $(CH_2)_x$ denotes one or more methylene groups, x an integer of from 1 to about 20 or a mixture of one or more compounds of General Formulas I and/or II.

More specifically the amorphous compound are esters of succinic acid or tartaric acid and Abitol E alcohol with the following structures;

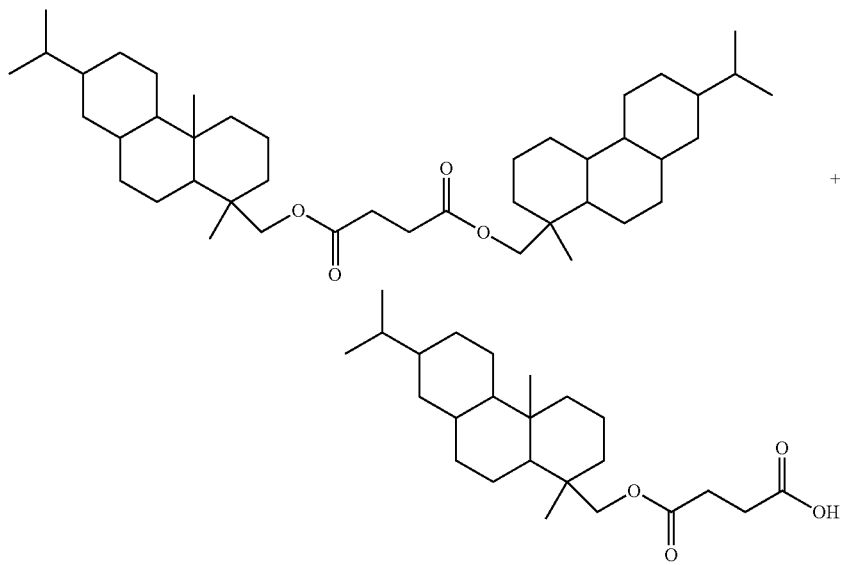

or

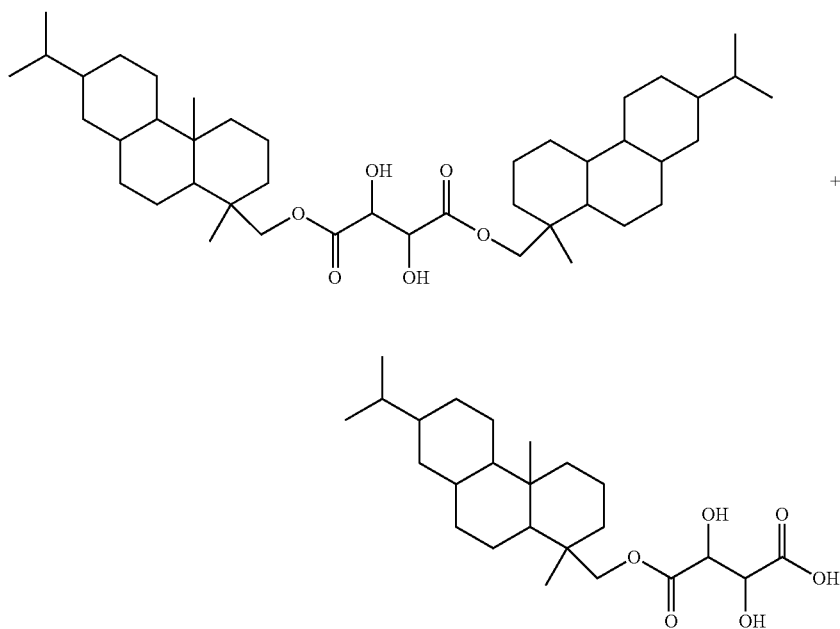

To synthesize the amorphous component, succinic acid or tartaric acid was reacted with ABITOL E™ alcohol (available from Hercules, Inc. (Wilmington, Del.)) as shown in the synthesis scheme shown in U.S. patent application Ser. No. 13/680,200 to Goredema et al., ABITOL E is shown by a representative structure, and comprises hydroabietyl alcohol (GASP 3393-93-6D, methyl ester of hydrogenated rosin (CAS[8050-15-5]), and decarboxylated rosin (CAS[8050-18-8])).

In specific embodiments, the amorphous binder is a di-ester of menthol and tartaric acid (DMT) (Compound 1 shown in Table 1 below). Tartaric acid is a bio-renewable material which is a common by-product from the wine industry. Menthol can also be bio-renewable, depending on where it is sourced. In other embodiments, the amorphous binder is an ester of a mixture of cyclohexanol and t-butylcyclohexanol (50:50 ratio) and tartaric acid (Compound 2 in Table 1 below). Compounds 1 and 2 are disclosed in U.S. patent application Ser. No. 13/095,784 to Morimitsu et al., which is hereby incorporated by reference in its entirety. In another specific embodiment, the amorphous binder is an ester of Abitol E and succinic acid di-ester (Compound 3 shown in Table 1 below). Abitol E is a resin derived from pine sap and bio-based succinic acid available from corn or sorghum. The bio-renewable content is based on the weight percent of bio-based materials. Compound 3 is disclosed in U.S. patent application Ser. No. 13/680,200 to Goredema et al., which is hereby incorporated by reference in its entirety.

TABLE 1

| Compound | Structure | Bio-renewable Content (%) |
|---|---|---|
| 1 | Dimenthyl Tartrate (DMT) | 27-100* |
| 2 | and mixtures TBCT (t-Butylcyclohexyl-Cyclohexyl Tartrate) | 31% |
| 3 | Abitol E Succinic Acid Di-ester + | 100 |

*BRC depends on menthol source

The amorphous compounds show relatively low viscosity (<10² centipoise (cps), or from about 1 to about 100 cps, or from about 5 to about 95 cps) near the jetting temperature (≤140° C.) but very high viscosity (>10⁵ cps) at room temperature.

In embodiments, the amorphous compounds are formulated with a crystalline compound to form a phase change ink composition. All of the crystalline component and binders are esters. This class of materials is well known to be readily biodegradable. The ink compositions show good rheological profiles. Print samples created by the phase change ink composition on coated paper by K-proof exhibit excellent robustness.

In embodiments, the amorphous material is present in an amount of from about 5 percent to about 50 percent by weight, or from about 10 percent to about 40 percent by weight, or from about 15 percent to about 30 percent by weight of the total weight of the ink composition.

The Crystalline Compound

In one specific embodiment, R and R' are the same. In embodiments, the crystalline compound is a di-ester compounds made from Scheme 1 below.

Scheme 1

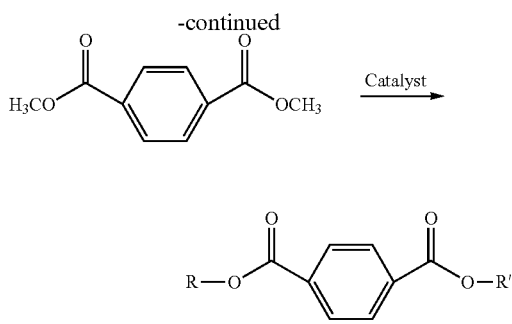

wherein R is a saturated or ethylenically unsaturated aliphatic group in one embodiment with at least about 6 carbon atoms, and in another embodiment with at least about 8 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges. R' is a saturated or ethylenically unsaturated aliphatic group in one embodiment with at least about 6 carbon atoms, and in another embodiment with at least about 8 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges. In a specific embodiment, the crystalline compound is derived from natural fatty alcohols such as octanol, stearyl alcohol, lauryl alcohol, behenyl alcohol, myristyl alcohol, capric alcohol, linoleyl alcohol, and the like. The above reaction may be conducted by combining dimethyl terephthalate, terephthalic acid or PETE and alcohol in the melt in the presence of a tin catalyst, such as, dibutyl tin dilaurate (Fascat 4202), dibutyl tin oxide (Fascat 4100); a zinc catalyst, such as Bi cat Z; or a bismuth catalyst, such as Bi cat 8124; Bi cat 8108, a titanium catalyst such as titanium dioxide. Only trace quantities of catalyst are required for the process.

In embodiments, the catalyst is present in an amount of about 0.01 weight percent to 2 weight percent or of about 0.05 weight percent to about 1 weight percent of the total product.

The reaction is carried out at an elevated temperature of about 150° C. to about 250° C. or from about 160° C. to about 210° C. The solvent-free process is environmentally sustainable and eliminates problems with byproducts and also means higher reactor throughput.

Most of these alcohols are bio-renewable materials derived from plant oils such as cotton, coconut, palm kernel, castor beans, rapeseed, soybeans, and sunflowers. These alcohols are reacted with dimethyl terephthalate, terephthalic acid or PETE to give the corresponding di-ester. Bio-renewable terephthalic acid is not yet available, however, the present embodiments provide a method for using recycled PETE with the alcohols to give the desired di-ester. Scheme 2 below shows the use of alcohol with PETE to produce di-ester.

Scheme 2

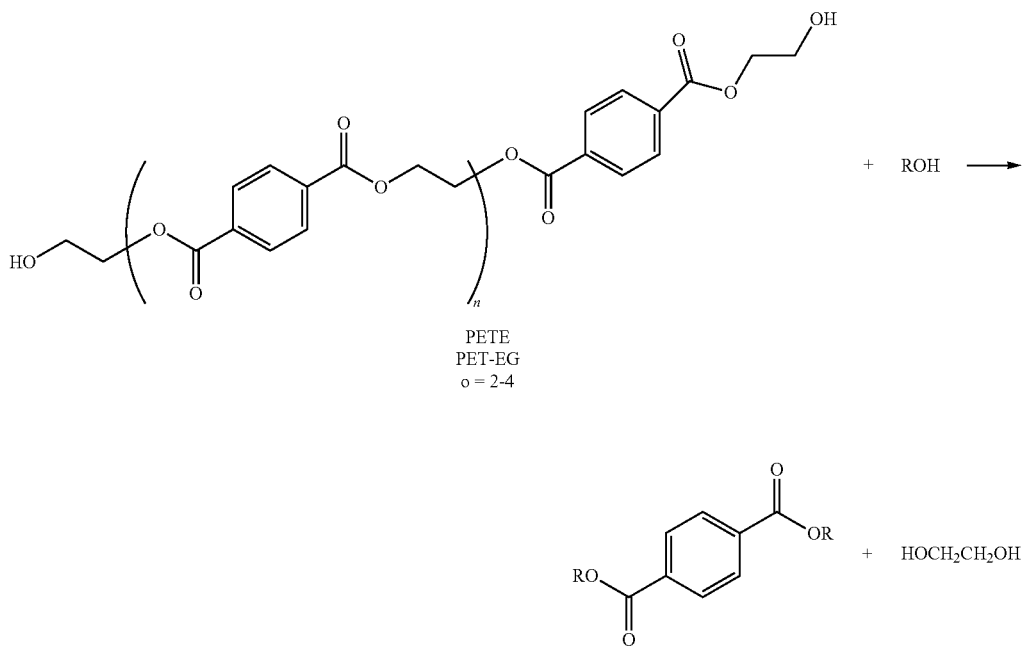

In embodiments, the alcohol has the structure ROH where R is an alkyl chain having from about 12 to about 24 carbon atoms. According the Scheme 2, distearylterephthalate (DST) can be produced from the reaction of PETE with stearyl alcohol (C12), and dibehenylterephthalate (DBT) can be produced from the reaction of behenyl alcohol.

In embodiments, the PETE is obtained through depolymerization of polyethylene (PET) via glycolysis, as shown in Scheme 3. The glycolysis involves two steps: (i) PET flakes obtained by grinding of PET plastics; and (ii) partial depolymerization with ethylene glycol (EG) and a trans-esterification catalyst. The resulting de-polymerized material is known as PETE, and is commercially available from Reichhold, Inc. (Durham, N.C.). The process for the preparation of DST from PETE and stearyl alcohol has a reaction cycle time of 6 hours, as compared to 20 hours when prepared from dimethyl terephthalate and stearyl alcohol.

Scheme 3

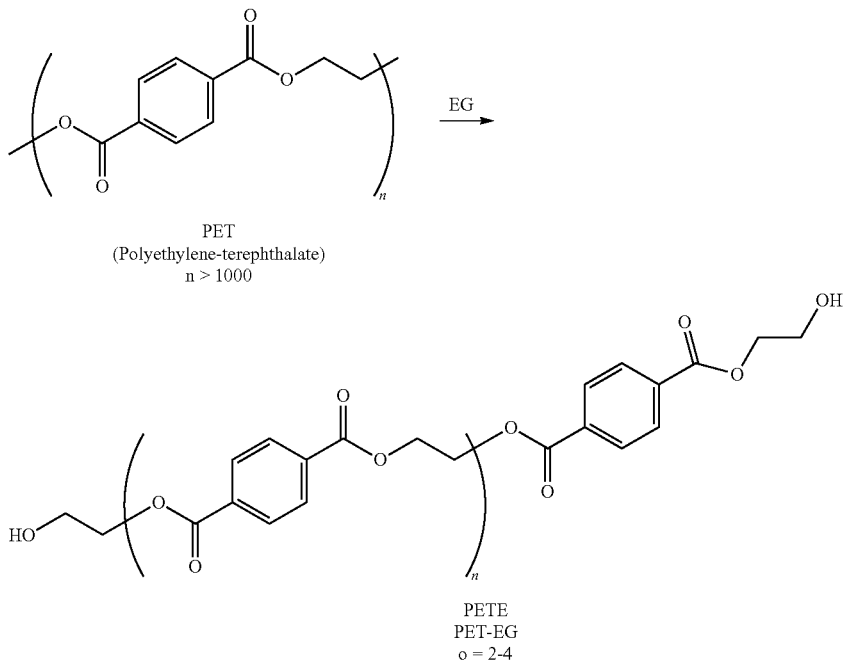

PET
(Polyethylene-terephthalate)
n > 1000

PETE
PET-EG
o = 2-4

Specific alcohols for use to make the di-ester compounds (for use as the crystalline compound) is shown in Table 2. Both compounds showed very sharp transitions within the desirable temperature range (i.e., 60° C.<T<130° C.) (Table 2) indicating promising properties for the phase changing material of the ink.

TABLE 2

| Compound | R—OH | Bio-renewable Content (%)* | $T_{melt}$ (° C.) (DSC) | $T_{cryst}$ ° C.) (DSC) | Viscosity at 140° C. (cps) |
|---|---|---|---|---|---|
| 1 | Stearyl alcohol $(CH_3(CH_2)_{17}OH)$ | 80 | 88 | 79 | 4.5 |
| 2 | Behenyl Alcohol $(CH_3(CH_2)_{21}OH)$ | 83 | 95 | 82 | 4.8 |

*Note:
All these materials have a very high potential to have 100% BRC.

The bio-renewable content is based on the weight percent of bio-based materials. All of the starting materials used to make the crystalline components of the present embodiments are inexpensive. Moreover, these materials are prepared by simple, low-cost and environmentally benign synthetic routes using solvent-less condensation procedures with methanol as the only by-product.

Another important requirement for the phase change ink of the present embodiments is for the ink components to be stable at the high jetting temperatures for a prolonged period of time. Compound 1 in Table 2 was aged in the oven at 140° C. for seven days to test its stability.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity ($>10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The ΔT between $T_{melt}$ and $T_{crys}$ is less than about 55° C.

In embodiments, the amorphous compound is a di-ester compound selected from the group consisting of structures shown below and mixtures thereof:

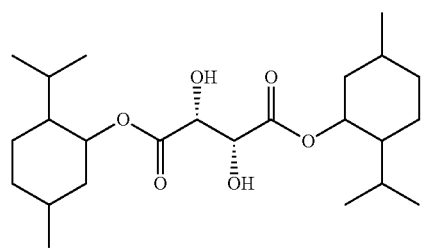

Dimethyl Tartrate (DMT)

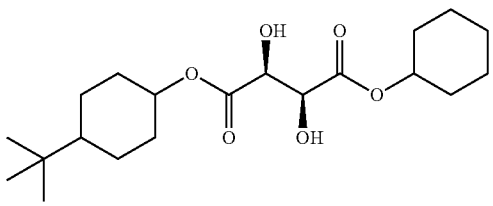

and mixtures
TBCT
(t-Butylcyclohexyl-Cyclohexyl Tartrate)

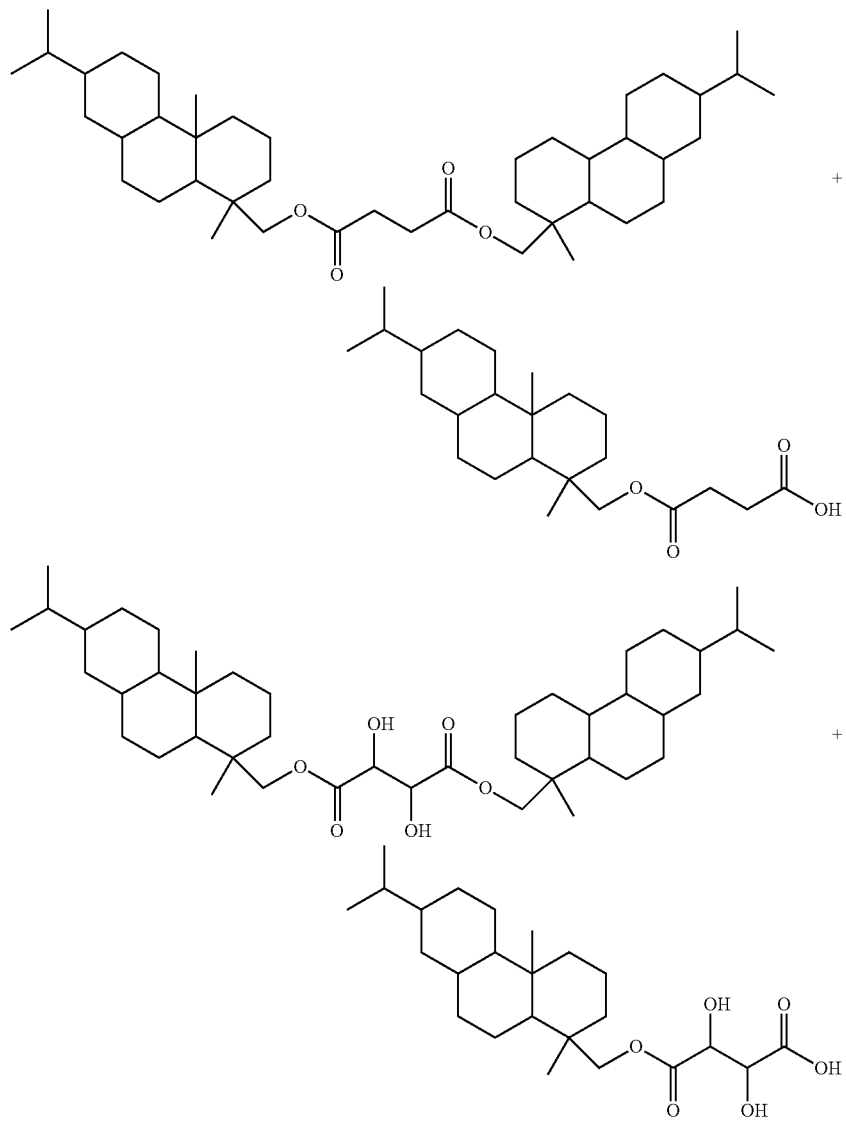

In embodiments, the crystalline material is present in an amount of from about 60 percent to about 95 percent by weight, or from about 65 percent to about 95 percent by weight, or from about 70 percent to about 90 percent by weight of the total weight of the ink composition.

Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Aldrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl- 2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tent-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorants

In embodiments, the phase change ink compositions described herein also include a colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (Ci. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade By); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2G01 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E $O_2$ (Clariant); Hansa Brilliant Yellow 5GX03 (Clariant); Permanent Yellow GRL $O_2$ (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis of Distearyl Terephthalate

Compound 1, Table 2

A 2 Liter Buchi reactor equipped with a mechanical stirrer, bottom drain valve and distillation apparatus, was charged with de-polymerized PETE (315 grams), FASCAT 4100 (2.5 grams) and stearyl alcohol (605.8) grams. The mixture was heated to 160° C. with nitrogen purge, and the mechanical agitator (Twin blade, P3 pitch) was stirred at 100 rpm. The mixture was heated to 195° C. over a 3 hour period, and then heated to 205° C. over a one hour period, followed by reducing the pressure using a vacuum pump to about 5 mm-Hg over a one hour period. The reaction was maintained for an additional hour, followed by pressurizing to atmospheric pressure with nitrogen, and followed by discharge through the bottom drain valve.

Table 3 below illustrates the alcohol used to synthesize the crystalline component and other properties of the crystalline component used in the inventive and control ink compositions.

TABLE 3

| No. | R—OH | Green Content* (%) | | $T_{melt}$ (° C.) (DSC) | $T_{cryst}$ (° C.) (DSC) | Viscosity at 140° C. |
| | | Bio-renewable Content | Recycled Content | | | |
|---|---|---|---|---|---|---|
| 1 | Stearyl alcohol ($CH_3(CH_2)_{17}OH$) | 80 | 20 | 82 | 75 | 5.61 |
| Control | — | 80 | 0 | 85 | 80 | 4.86 |

*Green content is a combination of bio-renewable content (BRC) and recycled content (RC)

Ink Example 1

Preparation of Ink Containing Distearyl Terephthalate

Into a 30 mL amber bottle was charged, in the following order: distearyl terephthalate 3.92 g of (Compound 1 of Table 2, 78.4 wt %) and 0.98 g of Abitol E Succinic acid di-ester (100% BRC). The Abitol E Succinic acid di-ester compound is described in U.S. patent application Ser. No. 13/680,200 to Goredema et al. The materials were melted at 140° C. and stirred using a magnetic stir bar for 30 minutes after which was added 0.1 g Keyplast Solvent blue 101 dye (2 wt %, purchased from Keystone) to the molten mixture. The ink was stirred for an additional 1 hour at 140° C., poured in an Aluminum tray and cooled to room temperature.

Ink Example 2

An ink was made in accordance with Ink Example 1 except that Abitol E Tartaric Acid Binder (100% BRC) was used as the amorphous component.

Control Ink

Preparation of Control Ink

In a 50 mL beaker was added Keyplast Solvent blue 101 dye, distearylterephthalate crystalline resin, and t-butylcylohexyl-cyclohexyl tartrate amorphous resin such that the ink contains 2% pigment and such that the remaining ink base crystalline to amorphous ratio is 80:20. The mixture was then stirred at 130° C. for 2 hours and poured into a pan to solidify.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
an amorphous component;
a crystalline component having the following structure:

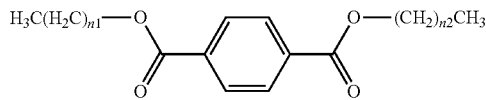

wherein n1 is between 1 and 40, and n2 is between 1 and 40; and
an optional colorant, wherein the crystalline compound is derived from bio-renewable and recycled starting materials; wherein the phase change ink has at least 20% percent by weight of bio-renewable content.

2. The phase change ink of claim 1 having at least 70% percent by weight of green content.

3. The phase change ink of claim 2 having greater than 95% green content.

4. The phase change ink of claim 1, wherein the crystalline component is derived from recycled oligomeric polyethylene terephthalate.

5. The phase change ink of claim 1, wherein the crystalline compound is present in an amount of from about 60 percent to about 95 percent by weight of the total weight of the phase change ink.

6. The phase change ink of claim 1, wherein the amorphous compound is present in an amount of from about 5 percent to about 40 percent by weight of the total weight of the phase change ink.

7. The phase change ink of claim 1 having a ratio of crystalline to amorphous ratio of from about 60:40 to about 95:5.

8. The phase change ink of claim 1, wherein the crystalline component has a viscosity of less than 12 cps at a temperature of about 140° C.

9. The phase change ink of claim 1, wherein the crystalline component has $T_{melt}$ of less than 150° C.

10. The phase change ink of claim 1, wherein the crystalline component has $T_{crys}$ of greater than 60° C.

11. The phase change ink of claim 1 having a viscosity of from about 1 to about 22 cps in a jetting range of from about 100 to about 140° C.

12. The phase change ink of claim 1 having a viscosity of greater than about $10^6$ cps at room temperature.

13. A phase change ink comprising:
an amorphous component selected from the group consisting of Abitol E succinic acid, Abitol E tartaric acid, and mixtures thereof;
a crystalline component having the following structure:

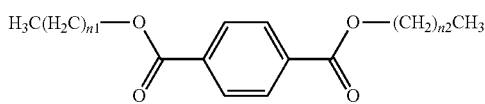

wherein n1 is between 1 and 40, and n2 is between 1 and 40; and a colorant, wherein the crystalline compound is derived from bio-renewable and recycled starting materials; wherein the phase change ink has at least 20% percent by weight of bio-renewable content.

14. The phase change ink of claim 13, wherein the crystalline component is derived from recycled oligomeric polyethylene terephthalate.

15. The phase change ink of claim 13, wherein the crystalline component is comprised of from about 60 to about 100% bio-renewable content.

16. The phase change ink of claim 13, wherein the crystalline component is comprised of from about 10 to about 40% recycled content.

17. A method for making a phase change ink comprising:
initiating glycolysis of recycled polyethylene terephthalate plastics to form oligomeric polyethylene terephthalate;
reacting the oligomeric polyethylene terephthalate with a bio-renewable alcohol to produce a crystalline component having the following structure:

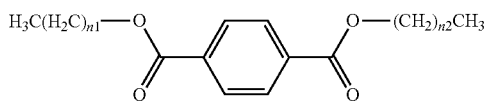

wherein n1 is between 1 and 40, and n2 is between 1 and 40;
mixing together an amorphous component, the crystalline component and an optional colorant to form a phase change ink, wherein the crystalline compound is derived from bio-renewable and recycled starting materials.

18. The method of claim 17, wherein the bio-renewable alcohol is selected from the group consisting of octanol, stearyl alcohol, lauryl alcohol, behenyl alcohol, myristyl alcohol, capric alcohol, linoleyl alcohol, and mixtures thereof.

19. The method of claim 17, wherein the phase change ink has at least 70% percent by weight of green content.

20. The method of claim 19, wherein the phase change ink has greater than 95% green content.

* * * * *